Dec. 27, 1966  R. W. BERGMANN ET AL  3,294,180

PLOW MOUNTED HARROW

Filed May 27, 1965

INVENTORS
Raymond W. Bergmann
BY Lowell W. Albers

Sam J. Slotsky
ATTORNEY 3,294,180
PLOW MOUNTED HARROW
Raymond W. Bergmann, Cushing, Iowa 31018, and
Lowell W. Albers, Battle Creek, Iowa 51006
Filed May 27, 1965, Ser. No. 459,263
1 Claim. (Cl. 172—197)

Our invention relates to a plow mounted harrow.

An object of our invention is to provide an arrangement whereby the harrow is carried by a plow, and wherein the harrow will be raised when the plow is raised, and to further provide an adjustable arrangement wherein the harrow can be adjustably regulated vertically with respect to the plow to provide for various penetration depths, as well as to provide for an arrangement wherein the harrow will follow the contour of the soil in a flexible manner.

A further object of our invention is to provide a relatively simple construction which can be manufactured at a reasonable cost.

Figure 1:
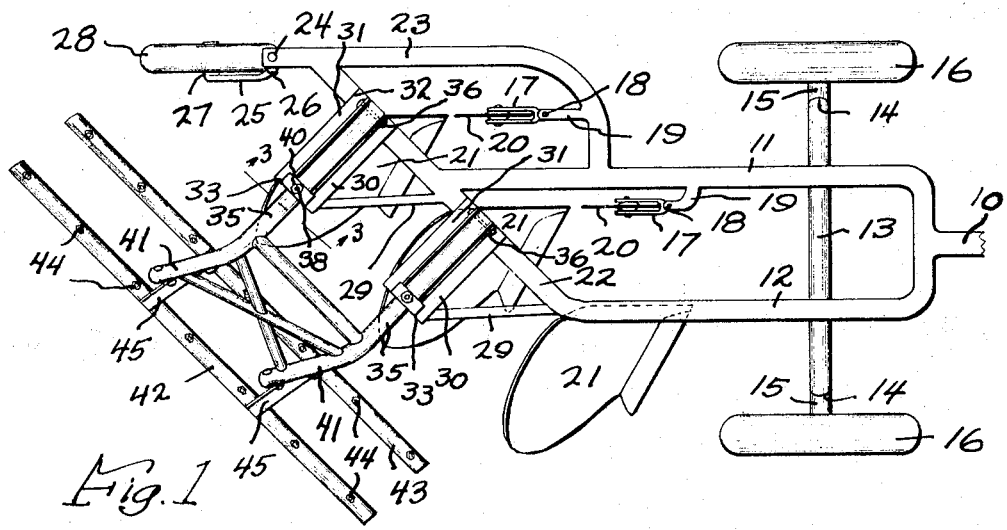
Figure 2:
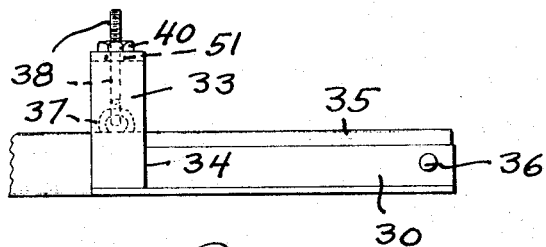
Figure 3:
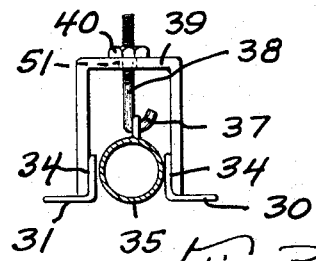
Figure 4:
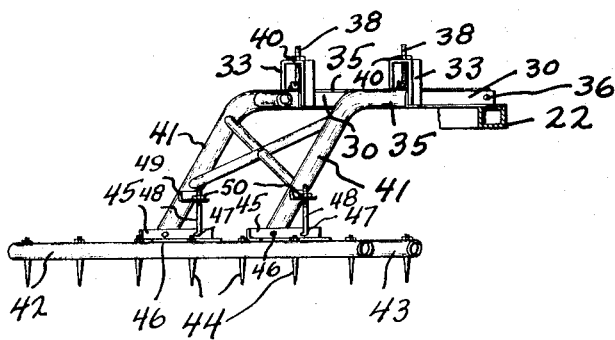

With these and other objects in view, our invention consists in the construction, arrangement, and combination of the various parts of our device, whereby the objects contemplated are attained, as hereinafter more fully set forth, pointed out in our claim, and illustrated in the accompanying drawings, in which:

FIGURE 1 is a plan view of the arrangement,
FIGURE 2 is an enlarged detail,
FIGURE 3 is an enlarged sectional detail taken along the 3—3 of FIGURE 1, and
FIGURE 4 is a side elevation of a portion of FIGURE 1.

Our invention contemplates the provision of a harrow which will be carried by a plow and so that when the plow is raised out of the ground, the harrow will be raised simultaneously, thereby eliminating the need for separate raising of the harrow itself, etc.

In describin gour invention we have used the character 10 to designate a hitch which is suitably attached to a tractor or other drawing vehicle, the hitch being attached to the rearwardly projecting box-shaped elements 11 and 12, which are secured to the axle portion 13, the axle portion 13 extending into the vertically positioned portions 14 which in turn are attached to the horizontally positioned portions 15 upon which the wheels 16 are journalled.

The character 17 indicates frameworks pivotally attached at 18 to the members 19, in which members 17 the soil cutting discs 20 are mounted, and which discs travel ahead of the plow members 21 of the usual construction, these plow members being suitably secured to the framework portion 22 which is suitably secured to the members 11, 12 and the further member 23. Pivotally secured at 24 to the member 23 is a fork member 25 which is suitably arranged to pivot at 26, and the fork member 25 includes the short shaft 27 attached thereto, upon which is journalled the rear wheel 28.

The character 29 indicates further bracing members suitably secured to the angle members 30, the character 31 indicating further angle members, the members 30 and 31 being welded as at 32 to the member 22. The character 33 indicates U-shaped members welded at 34 to the angle members 30 and 31.

The character 35 indicates tubular members pivoted at 36 to the angle members 30 and 31, and which tubular members 35 are positioned within the U-shaped members 33 (see FIGURE 3).

Loosely engaging the members 35 through the ears 37 are the ends of the vertical bolts 38 which are received through suitable openings within the portion 39 of the U-shaped members, the character 40 indicating nuts threadably engaged with the bolts 38.

The members 35 extend into the portions 41 which are inclined downwardly and laterally as shown.

The character 42 indicates a transversely and angularly positioned pipe which is spaced from a similar pipe 43, and attached to these pipes are the harrow teeth 44 which are arranged in staggered relation. Attached across the pipes 42 and 43 are the angle members 45, the angle members 45 being pivoted at 46 to the portions 41, and pivotally engaged at 47 with the angle members 45 are the bolts 48 which are received through the angles 49 which are secured to the members 41, the bolts 48 being threadably engaged with the nuts 50.

The arrangement operates in the following manner. The varoius members 11, 12, 23 and 22, etc. comprise a standard plow upon which our device is mounted, and in mounting the harrow itself the angles 30, 31, U-shaped members 33, the members 35, 41, etc. together with the harrow and the harrow frameworks are mounted on the plow as described, and will thereby be carried by the plow.

The plow is raised by merely applying a hydraulic cylinder and piston rod in the proper manner to the vertical portions 14 which extend from the shaft 13, and whereby when these vertical portions are raised to a vertical position as shown in FIGURE 1, the plow framework 11, 12, etc. will also be raised, since the hitching member 10 will be secured at its forward end, which will carry the various other members 22, 35, and 41 upwardly also. During this raising action the bracket 25 will swivel downwardly so that the wheel 28 will rest upon the ground at all times.

It will be noted that when the plow is raised, the connections at 37 to the members 35 will raise the harrow portions at the same time. However, it will also be noted that the members 35 can pivot at 36 as the harrow travels along the gound, when the plow is in the ground engaging position, and will thereby freely pivot to provide an oscillating action whereby the harrow teeth will ride over the ground regardless of the contour thereof. The nuts 40 can be adjusted on the bolts 38 to provide any desired range of pivoting action, or any required penetration into the ground, since the bolts 38 will rise and fall as a result any desired adjustment can be made. Also, through the openings 51 through which the bolts pass, and as a result nuts 50 at the angles 49, the forward bar 43 can be raised or lowered as required consistent with further soil conditions encountered.

As a result it will be noted that the action of the plow and harrow is simultaneous, the harrow will be lifted at the same time that the plow is lifted, etc. and will include all the advantageous features mentioned herein, with other advantages being apparent.

Some changes may be made in the construction and arrangement of the parts of our invention without departing from the real spirit and purpose of our invention, and it is our intention to cover by our claim any modified forms of structure or use of mechanical equivalents which may be reasonably included within their scope.

We claim as our invention:

A plow mounted harrow comprising a plow framework, a harrow mounted on said framework, said harrow being secured to said plow framework whereby raising of said plow framework will raise said harrow, means for adjustably attaching said harrow to said plow framework for providing adjustable positioning of said harrow with respect to said framework, said means including pairs of spaced angle members, said angle members being secured to said plow framework, said harrow including rearwardly extending members, said members being pivotally attached to the forward ends of said angles, U-shaped members attached at the rearward ends of said angles adapted to receive said rearwardly extending members, means attached between said rearwardly extending members and said U-shaped members for adjustably supporting said rearwardly extending members, including bolts pivotally attached to said rearwardly extending members, said U-shaped members having openings receiving said bolts, nuts threadably engaging said bolts for varying the pivotal movement of said rearwardly extending members, said rearwardly extending members extending angularly, rearwardly, and angularly downwardly, said harrow including transversely and angularly positioned pipes harrow teeth attached to said pipes, further angles attached to said pipes, said further angles being pivotally attached to the lower ends of said rearwardly extending members, vertical rods attached to the other ends of said further angles, bracket angles attached to said rearwardly extending members, said vertical rods being adjustably attached to said bracket angle members to adjustably position said pipes with respect to each other, means for raising said framework.

References Cited by the Examiner

UNITED STATES PATENTS

| | | | |
|---|---|---|---|
| 1,580,145 | 4/1926 | Leyner | 172—739 X |
| 1,596,838 | 8/1926 | Houser | 172—198 |
| 1,615,679 | 1/1927 | Bruning | 172—202 |
| 2,274,767 | 3/1942 | Zink et al. | 172—178 X |
| 2,960,169 | 11/1960 | Collins | 172—198 |
| 3,085,634 | 4/1963 | Hotchkiss | 172—178 X |

ABRAHAM G. STONE, *Primary Examiner.*

JOE O. BOLT, JR., *Examiner.*

J. R. OAKS, *Assistant Examiner.*